United States Patent [19]

Nishikawa et al.

[11] Patent Number: 4,857,402

[45] Date of Patent: Aug. 15, 1989

[54] MAGNETIC RECORDING MEDIUM

[75] Inventors: Yasuo Nishikawa; Hajime Miyazuka; Nobuo Tsuji, all of Kanagawa, Japan

[73] Assignee: Fuji Photo Film Co., Ltd., Kanagawa, Japan

[21] Appl. No.: 33,704

[22] Filed: Apr. 3, 1987

[30] Foreign Application Priority Data

Apr. 3, 1986 [JP] Japan .................................. 61-77325

[51] Int. Cl.$^4$ .............................................. G11B 5/70
[52] U.S. Cl. ..................................... 428/336; 427/131; 428/694; 428/695; 428/900
[58] Field of Search ....................... 428/694, 695, 336; 427/128, 131

[56] References Cited

U.S. PATENT DOCUMENTS

| | | | |
|---|---|---|---|
| 4,368,237 | 1/1983 | Yamada | 428/900 |
| 4,425,404 | 1/1984 | Suzuki | 428/900 |
| 4,514,451 | 4/1985 | Suzuki | 428/900 |
| 4,562,117 | 12/1985 | Kikukawa | 428/900 |
| 4,584,243 | 4/1986 | Kadokura | 428/900 |
| 4,590,127 | 5/1986 | Hashimoto | 428/900 |
| 4,624,892 | 11/1986 | Ishizaki | 428/694 |
| 4,647,507 | 3/1987 | Suzuki | 428/900 |
| 4,666,773 | 5/1987 | Kitamoto | 428/900 |
| 4,701,375 | 10/1987 | Nishimatsu | 428/900 |

FOREIGN PATENT DOCUMENTS 63-186 2/1986 Japan .

Primary Examiner—Paul J. Thibodeau
Attorney, Agent, or Firm—Sughrue, Mion, Zinn, Macpeak & Seas

[57] ABSTRACT

A magnetic recording medium comprising a non-magnetic support having provided thereon a magnetic layer containing ferromagnetic particles and a binder, wherein the magnetic layer contains at least one lubricating agent selected from the group consisting of a salt of a sulfonic acid and a salt of sulfuric acid ester.

10 Claims, No Drawings

MAGNETIC RECORDING MEDIUM

FIELD OF THE INVENTION

The present invention relates to magnetic recording medium, and more particularly to a magnetic recording medium having excellent electromagnetic properties and running durability.

BACKGROUND OF THE INVENTION

The demand for higher density recording in a magnetic recording medium has been increased. In order to meet the above requirement, a means to make the surface of a magnetic layer smooth has been known. However, when the surface of a magnetic layer is made smooth, the friction coefficient of contact between a magnetic layer and a running system is increased during running of the magnetic recording medium. This results in the magnetic layer of the magnetic recording medium being damaged or the magnetic layer being peeled off after a short period of use.

In many cases a video tape is put under such a harsh condition that the magnetic layer thereof is peeled off during a still mode. Under such a condition, the magnetic particles easily come off from the magnetic layer which, in many cases, causes clogging of the magnetic head.

It has been proposed in the past that abrasive (hard particles) such as corundum, silicon carbide, chromium oxide or the like should be added to a magnetic layer in order to improve the running durability of a magnetic layer. In such a case, a relatively large amount of abrasive agents must be added to effectively improve the running durability thereof. However, a large amount of abrasive agents caused the magnetic head to quickly wear out.

Furthermore, it is proposed that a fatty acid, or an ester of fatty acid and aliphatic alcohol should be added as a lubricating agent to a magnetic layer to decrease the friction coefficient.

With the recent wide spread use of portable video tape recorders and flexible disk drive apparatuses for personal computers, magnetic recording medium are used under conditions at low temperatures or high temperatures and at high humidities. Accordingly, the running durability of a magnetic recording medium must not fluctuate and must be stable under any variable conceivable conditions. However, the above-described lubricating agents are not satisfactory under all conditions.

As the size of a recording medium, particularly, a video tape and a floppy disk, is made smaller and smaller by compressing the recording wave lengths and track widths, ferromagnetic alloy particles have often been used as materials for magnetic particles instead of conventionally used iron oxide type ferromagnetic particles. Further, magnetic particles having a smaller size than conventional ones have often been used. Relatively excellent electromagnetic properties can be obtained by reducing the size of magnetic particles, but it has been difficult to simultaneously improve the running durability.

SUMMARY OF THE INVENTION

Accordingly, object of the present invention is to provide a magnetic recording medium having excellent electromagnetic properties.

Another object of the present invention is to provide a magnetic recording medium having excellent running durability.

It has been found in the present invention that excellent electromagnetic properties and running durability, which is constantly stable even under harsh conditions, such as high temperatures and low humidities, can be obtained by adding a salt of a sulfonic acid or a salt of a sulfuric acid ester as a lubricating agent into a magnetic layer.

DETAILED DESCRIPTION OF THE INVENTION

The present invention relates to a magnetic recording medium comprising a non-magnetic support having coated thereon a magnetic layer containing ferromagnetic particles and a binder, wherein said magnetic layer contains at least one lubricating agent selected from the group consisting of a salt of a sulfonic acid, a salt of a sulfuric acid ester.

The non-magnetic supports used in the present invention are those generally used. Materials for forming a non-magnetic support include various synthetic resin films of polyethylene terephtalate, polypropylene, polycarbonate, polyethylene naphthalate, polyamide polyamide imide and polyimide and the like, and metal foils of aluminum and stainless steel. The non-magnetic support has a thickness of generally from 3 to 50 $\mu$m, preferably from 5 to 30 $\mu$m.

A backing layer may be provided on the surface of a non-magnetic support opposite to a magnetic layer. The backing layer comprises a binder such as a copolymer of vinyl acetate-vinyl chloride, nitro cellulose, polyurethane etc or a mixture thereof, and a powder such as carbon black in radius from 20 to 1000 nm, calcium carbonate in radius from 500 to 3000 nm, TiO$_2$, $\alpha$—Fe$_2$O$_3$, $\alpha$—Al$_2$O$_3$ Cr$_2$O$_3$ etc or a mixture thereof. The thickness of the backing layer is 0.1 to 5 $\mu$m, preferably 0.2 to 1 $\mu$m.

A salt of a sulfonic acid and /or a salt of a sulfuric acid ester should be provided in or on the surface of the magnetic layer of the magnetic recording medium of the present invention, and preferably should be coated on the surface of the magnetic layer. The salt of sulfonic acid or salt of sulfuric acid ester included in the magnetic layer may be present homogeneously, and it is preferred that the salt of the sulfonic acid or the salt of the sulfuric acid ester included therein is locally present adjacent to the surface of the magnetic layer. The preferable salts of sulfonic acid and salt of sulfuric acid ester used in the present invention are alkane sulfonate and alkyl sulfate salts. The specific examples thereof are sodium ethane sulfonate, sodium propane sulfonate, sodium butane sulfonate, sodium pentane sulfonate, sodium hexane sulfonate, sodium heptane sulfonate, sodium octane sulfonate, sodium nonane sulfonate, sodium decane sulfonate, sodium undecane sulfonate, sodium dodecane sulfonate, sodium tridecane sulfonate, sodium tetradecane sulfonate, sodium pentadecane sulfonate, sodium hexadecane sulfonate, sodium heptadecane sulfonate, sodium octadecane sulfonate, sodium nonadecane sulfonate, sodium eicosane sulfonate, potassium ethane sulfonate, potassium propane sulfonate, potassium butane sulfonate, potassium pentane sulfonate, potassium hexane sulfonate, potassium heptane sulfonate, potassium octane sulfonate, potassium nonane sulfonate, potassium decane sulfonate, potassium undecane sulfonate, potassium dodecane sulfonate, potassium tridecane sulfonate, potassium tetradecane sulfonate, potassium pentadecane sulfonate, potassium hexadecane sulfonate, potassium heptadecane sulfonate, potassium octadecane sulfonate, potassium nonadecane sulfonate, potassium eicosane sulfonate, sodium ethylsulfate sodium propyl sulfate, sodium butyl sulfate, sodium pentyl sulfate, sodium hexyl sulfate, sodium heptyl sulfate, sodium octyl sulfate, sodium nonyl sulfate, sodium decyl sulfate, sodium undecyl sulfate, sodium dodecyl sulfate, sodium tridecyl sulfate, sodium tetradecyl sulfate, sodium pentadecyl sulfate, sodium hexadecyl sulfate, sodium heptadecyl sulfate, sodium octadecyl sulfate, sodium nonadecylsulfate, sodium eicocyl sulfate, potassium ethyl sulfate, potassium propyl sulfate, potassium butyl sulfate, potassium bentyl sulfate, potassium hexyl sulfate, potassium heptyl sulfate, potassium octyl sulfate, potassium nonyl sulfate, potassium decyl sulfate, potassium undecyl sulfate, potassium dodecyl sulfate, potassium tridecyl sulfate, potassium tetradecyl sulfate, potassium pentadecyl sulfate, potassium hexadecyl sulfate, potassium heptadecyl sulfate, potassium octadecyl sulfate, potassium nonadecyl sulfate, potassium eicosyl sulfate, salts of sulfonic acid or sulfuric acid ester with zinc, magnesium, calcium, or aluminum and the like and ammonium salts. Among those, those having 12 or more carbon atoms are particularly preferred.

The salt of sulfonic acid or salt of sulfuric acid ester is employed as an aqueous solution thereof and is coated on a magnetic layer. An aqueous solution of a salt of sulfonic acid or salt of sulfuric acid ester is prepared by dissolving a salt of sulfonic acid and/or salt of sulfuric acid ester in water, methanol, acetone, a mixed solvent of water and methanol or a mixed solvent of water and acetone and is coated by an air doctor coating method, a blade coating method, a rod coating method, an extruding method, an air knife coating method, a squeeze coating method, a impregnating coating method, a reverse roll coating method, a transfer roll coating method, a gravure coating method, a kiss coating method, a cast coating method, a spray coating method, a spin coating method or a bar coating method and the like. When the salt of sulfonic acid or salt of sulfuric acid ester is coated, the amount used is preferably 10 to 500 mg/m$_2$ more preferably 20 to 200 mg/m$_2$ when the salt of sulfonic acid or salt of sulfuric acid ester is incorporated in a magnetic coating composition, the ratio of additive amounts thereof is preferably 0.01 wt% to 10.0 wt%, more preferably 0.05 wt% to 6wt%.

The ferromagnetic particles used in the present invention are not particularly limited, and include ferromagnetic alloy particles, $\gamma$-$Fe_2O_3$, $Fe_3O_4$, Co modified iron oxide $CoO_2$, modified barium ferrite and modified strontium ferrite.

The shape of ferromagnetic particles is not particularly limited and generally an acicular shape, a granular shape, a dice shape, a rice grain shape and a plate shape can be used. The ferromagnetic particles have a specific surface area of 30 m$^2$/g or more, particularly preferably 45 m$_2$/g or more in view of electromagnetic properties.

The binders used in a magnetic layer are those selected from generally used binders. The examples thereof include a copolymer of vinyl chloride and vinyl acetate, a copolymer of vinyl chloride, vinyl acetate, vinyl alcohol, and maleic acid and/or acrylic acid, a copolymer of vinyl chloride and vinylidene chloride, a copolymer of vinyl chloride and acrylonitrile, a copolymer of ethylene and vinyl acetate, cellulose derivatives such as a nitrocellulose resin, an acrylic resin, a polyvinyl acetal resin, a polyvinyl butyral resin, an epoxy resin, a phenoxy resin, a polyurethane resin, a polycarbonate polyurethane resin and the like.

The mixing ratio of total binders included in the magnetic layer of the magnetic recording medium of the present invention is 10 to 100 parts by weight, preferably 20 to 40 parts by weight per 100 parts by weight of the ferromagnetic particles.

It is preferred that inorganic particles having Mohs' hardness of 5 or more are additionally included in a magnetic layer of a magnetic recording medium of the present invention.

The inorganic particles used in the invention are not particularly limited so long as these particles have a Mohs' hardness of 5 or more. Example of such inorganic particles having a Mohs' hardness of 5 or more include $Al_2O_3$, (Mohs' hardness 9), TiO (6), $TiO_2$ (6.5), $SiO_2$ (7), $SnO_2$ (6.5), $Cr_2O_3$ (9) and $\alpha$-$Fe_2O_3$ (5.5). These particles can be used alone or in combination.

Inorganic particles having a Mohs' hardness of 8 or more are particularly preferred. When such relatively soft inorganic particles as those having a Mohs' hardness of 5 or less are used, the inorganic particles easily come off from the magnetic layer and hardly have an abrasive function on a head, with the result that head clogging readily occurs and the running durability becomes poor.

The mixing ratio of inorganic particles is generally 0.1 to 20 parts by weight, preferably 1 to 10 parts by weight per 100 parts by weight of ferromagnetic particles.

It is also preferred that carbon black having an average particles size of 10 to 300 nm, preferably 15 to 200nm is added into magnetic layer in addition to the above inorganic particles, with the mixing ratio of the carbon black from 1 to 15 wt%, preferably 2 to 12 wt% per 100 wt% of ferromagnetic particles.

A method for preparing the magnetic recording medium of the present invention is illustrated hereinafter.

At first, a magnetic coating composition is prepared by mixing and kneading ferromagnetic particles, binders, the lubricating agent, and filling materials and additives, if desired with solvents. The solvents used herein are those conventionally used upon preparation of a magnetic coating composition.

Methods for mixing and kneading are not particularly limited. The order of adding each ingredient can be determined optionally.

For preparing the magnetic coating composition, a generally used mixing and kneading device can be used, for example, a two roll mill, a three roll mill, a ball mill, a pebble mill, Tron mill, a sand grinder, a szegvari attritor, a high speed impeller dispersing device, a high speed stone mill, a high speed impact mill, disper, a kneader, a high speed mixer, a homogenizer and ultrasonic dispersing device and the like.

For preparing the magnetic coating composition, conventionally known additives such as a dispersing agent, an antistatic agent, additional lubricating agents and the like can be added in combination.

Examples of the dispersing agents are conventional agents such as a fatty acid having from 12 to 22 carbon atoms acid (e.g., caprylic, capric acid, lauric acid, myristic acid, palmitic acid, stearic acid, behenic acid, oleic acid, elaidic acid, linoleic acid, linolenic acid, steararolic acid), metal soap composed of the above-described fatty acid and an alkali metal ( e.g., lithium, sodium, potassium, barium), a compound where all or a part of the hydrogens in an ester of the above-described fatty acid and the compounds thereof are substituted by fluorine atoms, an amide of the above-described fatty acid, an aliphatic amine, a higher alcohol, a polyalkylene oxide alkyl phosphate, a alkyl phosphate, an alkyl borate, a sarcosinate, an alkyl ether ester, a trialkylpolyolefin, an oxyquaternary ammonium salt, lecithin or the like.

The mixing ratio of the dispersing agents is 0.1 to 10 parts by weight, preferably per 100 parts by weight of the ferromagnetic particles.

Examples of antistatic agents are electroconductive particles such as carbon black or a carbon black graftpolymer; a natural surface active agent such as saponin; a nonionic surface active agent such as an alkylene oxide type, glycerin type and glycidol type; a cationic surface active agent such as higher alkyl amines, quaternary ammonium salts, salts of pyridine and other heterocyclic compounds, phosponium or sulphonium groups; an anionic surface active agent such as carboxylic acid, phosphoric acid, or a compound having an acid group of a sulfate group or a phosphate group; and an amphoteric surface active agent such as aminoacids, aminosulfonic acids, or sulfate or phosphate of aminoalcohol. When the above electroconductive particles are used as an antistatic agent, the mixing ratio of the particles is 0.1 to 10 parts by weight, preferably 0.5 to 10 parts by weight per 100 parts by weight of ferromagnetic particles. The mixing ratio of the surface active agent is 0.12 part by weight to 10 parts by weight per 100 parts by weight of the ferromagnetic particles.

Additional lubricating agents are in amount from 0.2 to 3 wt%, preferably from 0.5 to 2 wt% per 100 wt% of ferromagnetic particles and examples thereof are esters composed of a monobasic fatty acid having from 12 to 20 carbon atoms such as the above-described fatty acids, higher alcohols, butyl stearate, sorbitan oleate or the like and monohydric alcohol or polyhydric alcohols having from 3 to 20 carbon atoms, mineral oil, vegetable and animal oil, an olefin low molecular weight polymer, a fatty acid amide, silicone oil, modified silicone oil, an alkylene oxide adduct product of a fatty acid, and in addition to the above, conventional lubricating agents such as graphite particles, molybdenum disulfide particles or fine particles of a tetrafluoroethylene polymer and generally used lubricating agents for lastics.

The function of these additives should not be limited to those as specifically described above, but for example, it may be possible that a dispersing agent functions as a lubricating agent or as an antistatic agent. Therefore, when a substance having multi-functions is used, it is preferred that an additive amount thereof should be determined taking into account its multi-function effect.

The thus prepared magnetic coating composition is coated on the above-described non-magnetic support. The magnetic coating composition can be directly coated on the non-magnetic support or can be coated on the non-magnetic support through an adhesive layer. Examples of the adhesive layer are polyester, polyurethane, a vinyl chloride-vinyl acetate type copolymer, and the thickness thereof is 0.01 to 0.8 μm, preferably 0.3 to 0.5 μm.

The methods for coating a magnetic coating composition on a non-magnetic support include an air doctor coating method, a blade coating method, a rod coating method, an extrusion coating method, a squeeze coating method, an impregnating method, a reverse roll coating method, a transfer roll coating method, a gravure coating method, a kiss coating method, a cast coating method, a spray coating method and a spin coating method. Any other coating method can also be used.

The method for dispersing ferromagnetic particles in a binder and the method for coating on a support are disclosed in detail in Japanese Patent Application ( OPI ) No. 46011/1979 (the term "OPI" as used herein means "an unexamined published application") and 21805/1979.

The magnetic layer is coated so that the dry thickness is generally from about 0.5 to 10 μm, preferably from about 1.5 to 7.0 μm.

When a magnetic recording medium has a shape of a tape, a magnetic layer is subjected to magnetic orientation and is dried. A smoothing treatment can be conducted if necessary. And then the magnetic layer is cut to a desired shape.

The present invention is illustrated in more detail by the following nonlimiting Examples and Comparative Examples. In the Examples and Comparative Examples, all parts are by weight.

EXAMPLE 1

The composition having the following formulation was mixed and kneaded, dispersed in a ball mill for 48 hours, 5 parts of polyisocyanate was added thereto to react with polyurethane and bring "cross-link network" structure into the binder system and was further mixed, kneaded and dispersed for 1 hour. The mixture was filtered through a filter having an average pore diameter of 1 μm to obtain a magnetic coating composition. The magnetic coating composition was coated using a reverse roll on a polyethylene terephthalate support having a thickness of 10 μm so that the dry thickness of the layer was 4.0 μm.

| Magnetic coating composition, | |
|---|---|
| Ferromagnetic alloy particles (Fe 94%, Zn 4%, Ni 2%, Coercive force: 1500 Oe: specific surface area; 54 m$^2$/g) | 100 parts |
| Copolymer of vinyl chloride/vinyl acetate/maleic anhydride (manufactured by Nippon Zeon Co., Ltd., "400X110A", degree of polymerization 400) | 12 parts |
| Abrasive agent (α-alumina, average particle diameter 3 μm) | 5 parts |
| Salt of sulfonic acid or salt of sulfuric acid ester | shown in Table 1 |
| Stearic Acid | 1 part |
| Carbon black (average particle diameter 40 nm) | 2 parts |
| Methyl ethyl ketone | 300 parts |

The non-magnetic support thus coated with a magnetic coating composition was subjected to magnetic orientation using magnets with 3000 gausses while the coating composition was undried and was subjected to super calendering treatment after drying, and was slit to a width of 8 mm to prepare a video tape of 8 mm.

EXAMPLE 2

The coating composition having the following formulation was mixed, kneaded and dispersed in a ball mill for 48 hours, 5 parts of polyisocyanate was added thereto to react with polyurethane and bring "cross-link net work" structure into the binder system and furthermore mixed, kneaded and dispersed for 1 hour. The mixture was filtered by a filter having an average pore diameter of 1 μm to prepare a magnetic coating composition. The thus obtained coating composition was coated using a reverse roll on a polyethylene terephthalate support having a thickness of 10 μm so that the dry thickness of the later was 4.0 μm.

Formulation for magnetic coating composition:

| | |
|---|---|
| Ferromagnetic alloy particles (Fe 94%, Zn 4%, Ni 2%, coercive force: 1500 Oe; specific surface area: 54 mg/m$^2$) | 100 parts |
| Copolymer of Vinyl chloride (90 wt %)/vinyl acetate(8 wt %)/maleic anhydride(2 wt %) (manufactured by Nippon Zeon Co., Ltd. "400X110A", degree of polymerization 400) | 12 parts |
| Abrasive agent (α-alumina, average particle diameter 3 μm) | 5 parts |
| Stearic acid | 1 part |
| Carbon black (average particle diameter 40 nm) | 2 parts |
| Methyl ethyl ketone | 300 parts |

The non-magnetic support thus provided with a magnetic coating composition was subjected to magnetic orientation using magnets of 3000 gausses while the composition was undried, and was subjected to super calendering treatment after drying and coated using a bar coating method with an aqueous solution of salt of sulfonic acid or salt of sulfuric acid ester in Table 2 and was slit to a width of 8 mm to obtain 8 mm video tape The signals at 7 MHz were recorded on the thus prepared video tape using VTR ("FUJIX-8", manufactured by Fuji Photo Film Co., Ltd.) and reproduced.

When the reproduced output of signals at 7 MHz recorded on a standard tape (Comparative Example 1) was 0 dB, the reproduced outputs of other video tapes were measured and were shown in terms of the relative values.

When the thus obtained video tape was contacted with a stainless steel poles with a winding angle of 180° having a tension ($T_1$) of 50 g, a tension ($T_2$) necessary for the video tape to run at a rate of 3.3 cm/s was measured. Based on the thus obtained values, the friction coefficient μ of the video tape was calculated by the following formula, as shown in Tables 1 and 2.

$$\mu = 1/\pi \cdot \ln(T_2/T_1)$$

The above test as to the friction coefficient was done under two conditions, that is, under condition A of 5° C. and 70% RH and condition B of 40° C. and 80% RH.

The still durability was also checked under conditions. As clear from the results shown in Tables 1 and 2, tapes of Examples 1 through 10 using the lubricating agents of the present invention exhibit high reproduced outputs and low friction coefficient under conditions A and B.

On the other hand, tapes prepared by using only fatty acid or ester without using the lubricating agents of the present invention exhibit low reproduced outputs and high friction coefficient particularly under condition B of high temperature and high humidity.

Accordingly, the magnetic recording medium of present invention has excellent electromagnetic properties and excellent running durability even under harsh conditions.

While the invention has been described in detail and with reference to specific embodiments thereof, it will be apparent to one skilled on the art that various changes and modifications can be made therein without departing from the spirit and scope thereof.

TABLE 1

| Sample No. | Compounds to be added | Additive amount (part) | Reproduced outputs (dB) | Friction Coefficient condition A | Friction Coefficient condition B | Still durability (min.) |
|---|---|---|---|---|---|---|
| Example 6 | Sodium octadecane sulfonate | 3 | +3 | 0.02 | 0.24 | 120 |
| Example 7 | Sodium octadecyl sulfate | 2 | +3 | 0.21 | 0.23 | 120 |
| Comparative Example 4 | None | 0 | 0 | 0.30 | 0.37 | 40 |
| Comparative Example 5 | Oleic acid | 3 | 0 | 0.26 | 0.37 | 45 |
| Example 8 | Sodium Dodecyl sulfate | 3 | +2 | 0.22 | 0.24 | 120 |
| Example 9 | Sodium tetradecyl- benzene sulfonate | 4 | +2 | 0.22 | 0.22 | 120 |
| Example 10 | Sodium decanesulfate | 3 | +1 | 0.23 | 0.29 | 120 |
| Comparative Example 6 | 2-Ethylhexyl myristic acid | 3 | 0 | 0.25 | 0.34 | 100 |

TABLE 2

| Sample No. | Compounds to be coated | Amount to be coated (mg/m$^2$) | Reproduced output (dB) | Friction coefficient condition A | Friction coefficient condition B | Still durability (nin.) |
|---|---|---|---|---|---|---|
| Example 1 | Sodium octadecane sulfonate | 50 | +2 | 0.18 | 0.19 | 120 |
| Example 2 | Sodium octadecyl sulfate | 30 | +2 | 0.20 | 0.20 | 120 |
| Comparative Example 1 | None | 0 | 0 | 0.29 | 0.37 | 35 |
| Comparative Example 2 | Oleic acid | 40 | 0 | 0.28 | 0.38 | 40 |
| Example 3 | Sodium dodecyl sulfate | 50 | +1 | 0.19 | 0.21 | 120 |

TABLE 2-continued

| Sample No. | Compounds to be coated | Amount to be coated (mg/m$^2$) | Reproduced output (dB) | Friction coefficient condition A | Friction coefficient condition B | Still durability (nin.) |
| --- | --- | --- | --- | --- | --- | --- |
| Example 4 | Sodium tetradecyl-benzene sulfonate | 50 | +1 | 0.18 | 0.21 | 120 |
| Example 5 | Sodium decane sulfate | 50 | +1 | 0.20 | 0.28 | 120 |
| Comparative Example 3 | 2-Ethylhexyl myristic acid | 50 | 0 | 0.25 | 0.34 | 80 |

What is claimed is:

1. A magnetic recording medium comprising a nonmagnetic support having provided thereon a magnetic layer containing ferromagnetic particles and a binder, wherein said magnetic layer contains on the surface thereof at least one lubricating agent selected from the group consisting of a salt of a sulfonic acid and a salt of a sulfuric acid ester wherein said salt of a sulfonic acid or said salt of a sulfuric acid ester is coated on said magnetic layer in an amount of from 10 to 500 mg/m2.

2. The magnetic recording medium as claimed in claim 1, wherein said magnetic layer contains at least one lubricating agent selected from the group consisting of a salt of an alkane sulfonate and a salt of an alkyl sulfate.

3. The magnetic recording medium as claimed in claim 2, wherein metal included in said lubricating agent is sodium or potassium and the number of carbon atoms of said alkane sulfonate and said alkyl sulfate is 2 to 20.

4. The magnetic recording medium as claimed in claim 2, wherein said salt of an alkane sulfonate and salt of an alkyl sulfate have 12 or more carbon atoms.

5. The magnetic recording medium as claimed in claim 1, wherein said salt of a sulfonic acid or salt of a sulfuric acid ester is coated on said magnetic layer in an amount of from 20 to 200 mg/m$^2$.

6. The magnetic recording medium as claimed in claim 1, wherein said binder is employed in an amount of 10–100 parts by weight per 100 parts by weight of the ferromagnetic particles.

7. The magnetic recording medium as claimed in claim 6, wherein said binder is employed in an amount of 20–40 parts by weight per 100 parts by weight of the ferromagnetic particles.

8. The magnetic recording medium as claimed in claim 1, wherein said magnetic layer additionally contains inorganic particles having a Mohs' hardness of 5 or more.

9. The magnetic recording medium as claimed in claim 1, wherein said magnetic layer has a dry thickness of 0.5 to 10 μm.

10. The magnetic recording medium as claimed in claim 9, wherein said magnetic layer has a dry thickness of 1.5 TO 7.0 μm.

* * * * *